United States Patent [19]

Clopton

[11] 4,316,614
[45] Feb. 23, 1982

[54] HOLDING CHUCK

[75] Inventor: Robert T. Clopton, Can Mer, Ky.

[73] Assignee: Eaton Corporation, Cleveland, Ohio

[21] Appl. No.: 109,953

[22] Filed: Jan. 7, 1980

[51] Int. Cl.³ .................. B23B 31/18; B23F 23/06
[52] U.S. Cl. ........................... 279/1 G; 279/106; 409/62
[58] Field of Search ............... 409/62; 279/106, 1 G, 279/1 DA, 107, 108

[56] References Cited

U.S. PATENT DOCUMENTS

| | | | |
|---|---|---|---|
| 1,561,843 | 11/1925 | Garrison | 279/1 G |
| 1,881,905 | 10/1932 | Page et al. | 279/1 DA |
| 2,018,088 | 10/1935 | Poock et al. | 279/106 X |
| 2,885,212 | 5/1959 | Garrison et al. | 279/106 |
| 3,028,170 | 4/1962 | Norrick | 279/123 |
| 3,127,710 | 4/1964 | Karbowski | 51/135 |
| 3,149,853 | 9/1964 | Garrison | 279/106 |
| 3,420,538 | 1/1969 | Benjamin et al. | 279/106 X |
| 3,594,960 | 7/1971 | Fourquier | 279/1 R X |
| 3,618,961 | 11/1971 | Kiwalle | 279/106 |

Primary Examiner—William R. Briggs
Attorney, Agent, or Firm—C. H. Grace; H. D. Gordon

[57] ABSTRACT

A multiple jaw holding chuck (10) is provided which is quickly and easily adjusted to grip workpieces (W) on either the interior or exterior surfaces thereof. The holding chuck comprises a housing (12) having a plurality of bores (34) formed therein in which shafts (38) are rotationally received. The shafts carry jaws (50) on the free ends thereof and are quickly and easily removed and/or repositioned in the bores.

5 Claims, 6 Drawing Figures

HOLDING CHUCK

BACKGROUND OF THE INVENTION

1. Field of the Invention

The present invention relates to a holding chuck for machine tools or the like and more particularly relates to a universal type of multiple jaw holding chuck comprising a housing and a plurality of shafts rotatably received in said housing, one end of each shaft projecting from the housing and carrying a workpiece engaging jaw thereon, said shafts adapted to be quickly and easily replaced and/or repositioned allowing the chuck to be quickly and easily adapted to releasably grip various types of workpieces on either the interior or exterior surfaces of such workpieces.

2. Description of the Prior Art

Multiple jaw holding chucks comprising a plurality of jaws which are radially inwardly or outwardly movable relative to a reference line or axis to position and hold a workpiece at spaced locations on the workpiece interior diameter or exterior periphery are well known in the prior art. However, adjustment of the known prior art devices for purposes of modifying the holding chuck for releasaby engaging either the exterior or interior surface of a workpiece is time consuming and difficult or not possible.

SUMMARY OF THE INVENTION

In accordance with the present invention, the drawbacks of the prior art have been overcome or minimized to the extent that a multiple jaw holding chuck is provided which may be quickly and easily adapted to grip either the interior or exterior surfaces of a workpiece. The holding chuck is also easily adapted to provide jaws which are either axially fixed or selectively axially movably relative to a reference surface on the chuck housing during the chucking operation.

The above is accomplished by providing a housing defining a reference line or axis with respect to which a workpiece is to be releasaby positioned and held. The housing defines an end face which is generally perpendicular to the reference line. Opening to the end face, the housing defines a multiplicity of bores each having an axis generally parallel to the reference line. The bores are generally equally circumferentially and radially spaced relative to said reference line. A selectively removable shaft is rotatably received in each bore for rotation about the axis of said bore relative to said housing. Each of said shafts has a portion extending axially outwardly beyond said end face on which a jaw is mounted. Each jaw has a workpiece engaging portion which will pivot or rotate about an axis which is radially offset the rotational axis of the shaft portion received in the bore in response to rotation of the shaft portion in the bore, whereby rotation of said shafts in said bores will cause said workpiece engaging portions of said jaws to move radially inwardly or outwardly with respect to said reference line for selective engagement and release of workpieces. Means are provided within said housing for selectively rotating each of said shafts simultaneously and in the same direction of rotation in said bores. The shafts are provided with annular sealing means for sealing the interior of said housing and grooves are provided in the exterior surfaces of said shafts in which are received pin members removably fixed to the housing for controlling the axial position of the shafts relative to the housing. The grooves may be inclined relative to axis of the shafts to provide axial movement of the shafts relative to the housing during the chucking and unchucking operation and the pins are easily retractable from the bores to allow quick and easy removal, installation and/or repositioning of shafts into the housing bores.

Accordingly, it is an object of the present invention to provide a new and improved multiple jaw holding chuck.

A further object of the present invention is to provide a new and improved multiple jaw holding chuck having jaw members fixed to the free ends of shafts which are rotatably received in a housing and which shafts are easily assembled to or removed from the housing.

These and other objects and advantages of the present invention will become apparent from a reading of the detailed description of the invention taken in view of the accompanying drawings.

DESCRIPTION OF THE PREFERRED EMBODIMENT

Figure 1:
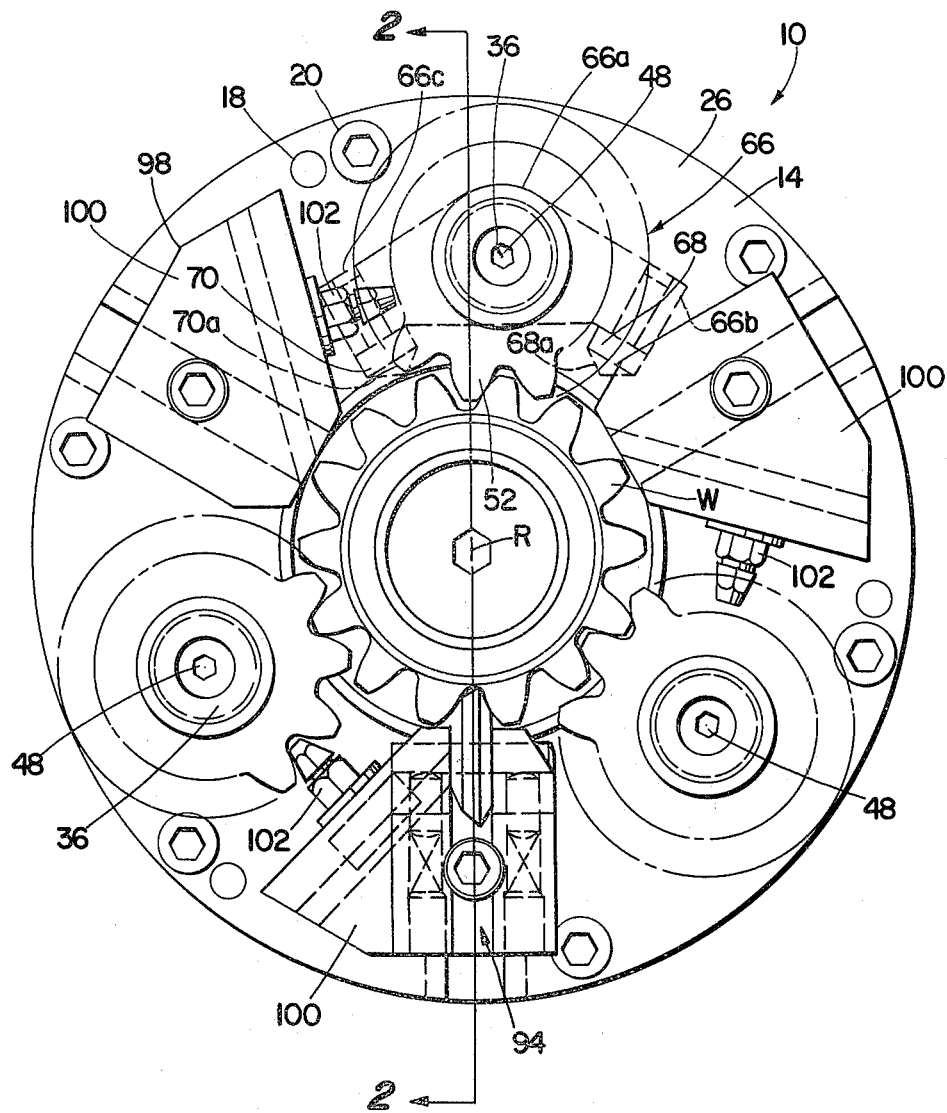
FIG. 1 is a front view of the holding chuck of the present invention.

Certain terminology will be used in the following description for convenience in reference only and will not be limiting. The words "upwardly", "downwardly", "rightwardly" and "leftwardly" will designate directions in the drawings to which reference is made. The words "inwardly" and "outwardly" will refer to directions toward and away from, respectively, the geometric drive center of the device and designated parts thereof. Said terminology will include the words above specifically mentioned, derivatives thereof and words of similar import.

Figure 2:
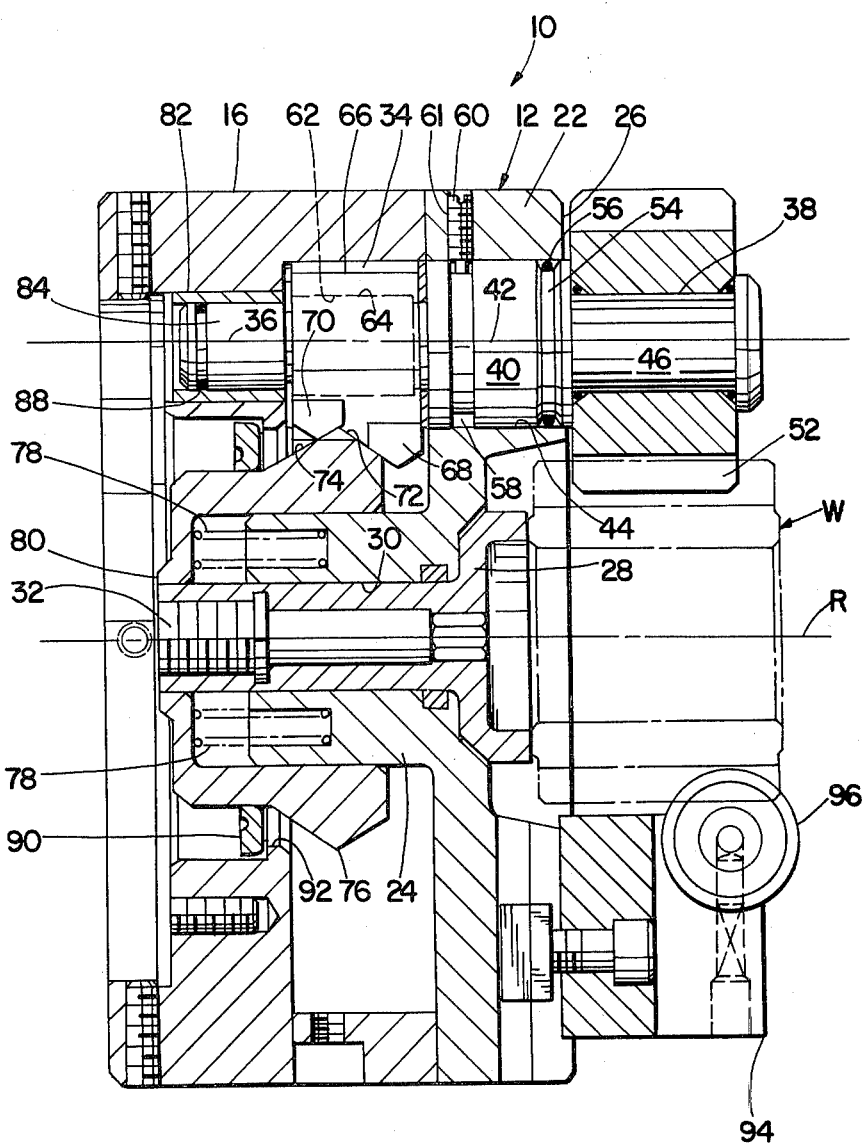
FIG. 2 is a side view in section of the holding chuck taken along the line 2—2 in FIG. 1.

The holding chuck 10 of the present invention may be seen by reference to FIGS. 1 and 2. Holding chuck 10 is designed to be mounted, usually for relative rotation, to a machine tool or the like (not shown) as is well known in the art. The holding chuck 10 is designed to position and releasably hold a workpiece W relative to a reference line or axis R fixed with respect to the machine tool. By way of example, the holding chuck 10 is illustrated as holding and positioning a gear shaped workpiece W (shown in phantom lines) on the outer periphery thereof for purposes of grinding the inner diameter, i.d., of the workpiece which is to be held concentric with reference line R. It is understood that the type of workpiece held by the chuck 10 described below is for purposes of example only and that holding chucks produced according to the present invention can easily be adapted to grip various types of workpieces on either the interior or exterior surfaces thereof.

The holding chuck 10 includes a housing 12 which has an axis generally coaxial with the reference line R. Housing 12 is either rotatable about reference line R if the machine tool utilizes tools which do not rotate about axis R or is fixed to the machine tool if the tools rotate about axis R. The housing 12 comprises a forward member 14 and a rearward member 16 which are joined in a conventional manner as by dowels 18 and cap screws 20.

Forward member 14 of the housing 12 comprises a generally flat flange shaped portion 22 and a centrally located hollow hub-shaped portion 24. The righthand outer surface 26 of flange-shaped portion 22 (as seen in FIG. 2) defines an end face of the housing. A stop member 28 is slidably and sealingly received in the inner bore 30 of the hub-shaped portion 24. The stop member acts as a stop to axially position the workpiece W relative to the housing 12 and may be selectively axially movable to act as a kick out member. Stop member 28 may also have a passage 32 therethrough to deliver coolant and/or lubricant to the workpiece and tools. An annular seal 33 may be utilized to seal the interface of stop member 28 and the inner bore 30 of the hub portion 24.

A plurality of bores 34, three in the embodiment shown, having axes 36 generally parallel to reference line R are formed in the housing 12. The axes 36 of bores 34 are equally circumferentially and radially spaced relative to reference line R.

Figure 3:
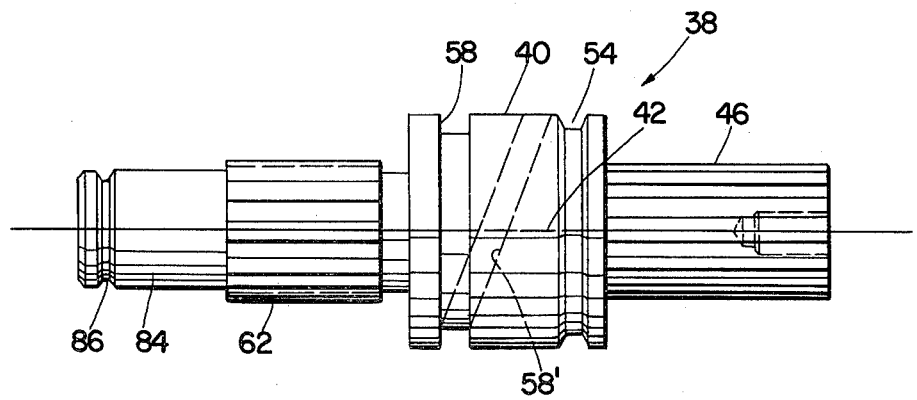
FIG. 3 is a side view of a shaft.
Figure 4:
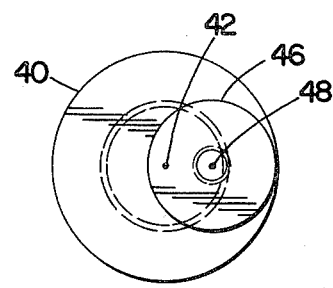
FIG. 4 is an end view of the shaft taken along the line 4—4 in FIG. 3.
Figure 5:
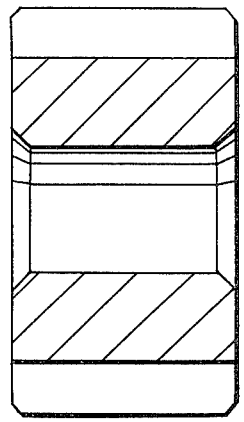
FIG. 5 is a side view in section of the jaw member.
Figure 6:
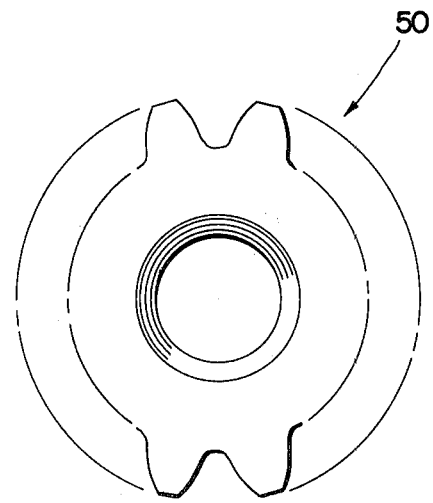
FIG. 6 is an end view of the jaw taken along line 6—6 in FIG. 5.

A selectively removable shaft 38 is rotatably and sealingly received in each bore 34. The detailed structure of shafts 38 may be seen by reference to FIGS. 3 and 4. Each shaft 38 includes an enlarged outer diameter portion 40 having an axis 42 which is sealingly received in enlarged inner diameter portion 44 of bore 34. Shaft 38 will thus rotate about its axis 42, which is coaxial with axis 36 of bore 34, relative to housing 12. Shaft 38 also includes a portion 46 which extends axial beyond the end face 26 of housing 12 and which has an axis 48 which is offset or eccentric relative to axes 36 and 42.

Mounted on eccentric shaft portion 46 and coaxial therewith is a jaw member 50. In the present embodiment, the jaw member is in the form of a gear or partial gear which will mesh with the gear shaped workpiece W and has a workpiece engaging surface 52 which is offset the rotational axis 42 of shaft 38. Thus, referring to FIG. 1, it may be seen that a counterclockwise rotation of shafts 38 will cause jaw members 50 to move radially outwardly from reference line R while a clockwise rotation of shaft 38 causes jaw members 50 to move radially inwardly relative to reference line R. It may thus be seen that by correctly positioning the workpiece engaging surface 52 of the jaw 50, and by selecting the correct type of jaw, the chuck 10 of the present invention may be used to grip either the outer periphery or the inner surface of a workpiece.

The enlarged outer diameter portion 40 of shaft 38 includes a first circumferential groove 54 in which an annular seal 56 is received to seal the bore 34 when shaft 38 is received therein. A second circumferential groove 58 is formed in the outer surface of shaft portion 40 and is designed to receive the inner end of a pin member 60 which extends radially into bore 34 to cooperate with the groove 58 to control the axial movement of shaft 38 relative to the housing 12. The pin 60 may be retracted from bore 34 to allow axial removal of shaft 38 from bore 34. The pins 60 are received in bores 61 which extend radially from the exterior of the housing 12 into the bores 34. A threaded connection between pin 60 and bore 61 is preferably provided. In the embodiment shown in solid lines, groove 58 is substantially perpendicular to the axis 36 of bore 34 and thus shaft 38 and jaw 50 will remain substantially axially stationary relative to end face 26 upon rotation of shaft 38. However, if groove 58' is generally helically shaped (as shown in phantom lines in FIG. 3) the shaft 38 and jaw member 50 will move axially relative to end face 26 upon rotation of shaft 38. This feature may be utilized to positively pull the workpiece down to the stop member 28 and/or to allow easier removal of a workpiece from the chuck 10.

Jaw member 50 is shown as splined to eccentric shaft portion 46, however any means to axially and rotationally fix the jaw to the shaft portion 46, such as by welding or the like, is satisfactory.

Each shaft 38 also includes an externally splined portion 62 which is designed to rotationally engage the interior splines 64 of a cam follower member 56 which is rotatably received in the rearward portion 16 of housing 12. The cam follower 66 carries two pin members 68 and 70 which engage surfaces 72 and 74 of an axially movable linear cam 76 to cause cam followers 66 to pivot about axis 36 upon axially movement of cam member 76 relative to housing 12. As may be seen by reference to FIG. 1, cam follower 66 includes a central portion 66a, generally centered about axis 36, which carries the internal splines 64, and two outwardly extending portions, or wings, 66b and 66c, extending generally outwardly from axis 36. Pin members 68 and 70, respectively, extend generally inwardly toward reference line R from the wings 66b and 66c, respectively.

The free ends, 68a and 70a, respectively, of pin members 68 and 70, respectively, are generally tapered for sliding engagement by generally similarly tapered surfaces 72 and 74, respectively, of the axially movable cam 76. Springs 78 bias axially movable linear cam member 76 to the left as seen in FIG. 2 and any linear actuator may be used to move cam member 76 rightwardly against the bias of springs 78 to cause a simultaneous counterclockwise rotation (as seen in FIG. 1) of cam followers 66 and the shafts 38 splined thereon. As may be seen by reference to FIGS. 1 and 2, a rightward axial movement of cam 76 from the position shown in FIG. 2 will cause free end 68a of pin member 68 to be engaged by and slide upwardly on surface 72 (radially outwardly as seen in FIG. 1), causing a counterclockwise rotation of cam follower 66 about axis 36 thereof. Such a counterclockwise rotation of cam follower 66 will, of course, cause pin member 70 to be moved downwardly (radially inwardly toward reference line R as seen in FIG. 1). A subsequent leftward axial movement of cam 76 to return the cam to the position shown in FIG. 2 will cause surface 74 to engage free end 70a of pin member 70 to rotate the cam follower clockwise to the position shown in FIG. 2. The holding chuck 10 is thus biased by springs 78 to the workpiece holding position shown in FIGS. 1 and 2 and will assume a workpiece loading/unloading position upon a rightward movement of axial cam 76.

As may be seen, by positioning shafts 38 in the cam followers 66 in a position rotated 180° from the position shown in FIG. 1, the spring will bias the jaws radially outwardly and axial movement of the cam 76 will cause radially inward movement of the jaws.

In the embodiment shown, the righthand surface 80 (see FIG. 2) of cam 76 is designed to engage a hydraulic cylinder in the machine tool. However, various selectively actuatable linear motors, such as pneumatic cylinders, solenoids and the like could be used to selectively move cam member 76 to the right.

Various means, such as gears or the like, may be utilized to selectively rotate shafts 38 simultaneously and in the same direction of rotation.

The housing portion 16 may include bushings 82 which will define a portion of bores 34 and will rotationally support the reduced outer diameter end portions 84 of shaft 38. Bore 34 is thus defined, in part, by the internal bore of bushing 82 and the enlarged diameter bore section 44. A circumferential groove 86 may be formed in the exterior surface of end portion 84 for receipt of an annular seal 88 for purposes of sealing the bore 34 when a shaft 38 is rotatably received therein.

An annular seal 90 is utilized to seal opening 92 in housing member 16 in which cam member 76 is slidably received.

The holding chuck 12 may also include a workpiece guide member 94 which includes a spring biased roller 96 for guiding workpieces into proper position in the chuck. The holding chuck 40 may also include jaw guides 98 which are adjustable to support and guide the jaw members 50. As may be seen, jaw guides 98 includes a block 100 radially adjustable on the end face 26 of housing member 14 and a pin member 102 which is adjustable in the block member 100 and will guide the jaw into proper position and/or provide support therefor.

It may thus be seen that a holding chuck is provided which may be easily adapted to releasably retain various types of workpieces on either the interior or exterior surfaces thereof. To adapt the holding chuck, pin member 60 is simply moved radially outwardly from bore 34 and then shafts 38 are pulled axially to the right (as seen in FIG. 2) from the housing. The same shafts or different shafts having different jaws 50 thereon may then simply be axially inserted into the bores 34 for making a splined connection with cam followers 66 and pin members moved radially inwardly and engaged into grooves 58. The seals 56 and 88 will provide sealing of bores 34 when shafts 38 are received therein. The jaws are thus quickly and easily replaceable and provide adequate sealing.

The invention, for purposes of disclosure, has been illustrated and described in a particular embodiment thereof. However, it is understood that various rearrangement and substitution of the parts may be resorted to without departing from the spirit and the scope of the invention as hereinafter claimed.

I claim:

1. A holding chuck for releasably positioning and holding a workpiece relative to an established reference line, said chuck comprising:

a housing including an end face extending substantially perpendicular to said reference line, a plurality of substantially identical first bores formed in said housing and opening to said end face, the axes of said bores being substantially parallel to said reference line and equally circumferentially and radially spaced relative to said reference line, a plurality of second bores extending radially inwardly from the exterior of said housing to intersect said first bores;

a shaft received in each of said first bores, each of said shafts having a first portion removably retained in said first bore for rotation about the axis of said first bore relative to said housing, each of said shafts having a second portion extending axially out from said first bores beyond said end face, each of said first portions of said shafts having a groove formed in the exterior surface thereof;

a pin member adjustably positioned in each of said second bores, each of said pin members having a first position wherein an end thereof extends into said first bore for receipt in said groove in one of said shafts to control the axial position of said shafts relative to said housing and a second position wherein said end is retracted from said grooves;

a jaw member defining a workpiece engaging surface fixed to the second portion of each shaft, each of said surfaces rotating about an axis offset the axis of the first bore receiving the shaft to which the jaw member is fixed when the first portion of said shaft is rotated in said housing about said axis of said first bore whereby such rotation of said first portions will cause said surfaces to move radially inwardly and outwardly with respect to said reference line; and means located within said housing for selectively rotating said first portions of said shafts simultaneously and in the same direction of rotation, said means including a single driving member and a separate driven member for each shaft, each driven member defining a bore having internal splines concentric with the axis of one of said bores, movement of said driving member resulting in an equal rotational movement of each of said driven members, each of said shafts having an externally splined portion for engagement with the internally splined portion of said driven members.

2. The chuck of claim 1 wherein said grooves are inclined with respect to the axis of said first portions whereby rotational movement of said shafts will result in axial movement of said jaw members relative to said end face.

3. The chuck of claim 1 or 2 wherein said first portions each include at least one second groove in which an annular seal is received.

4. The chuck of claim 3, wherein said driving member is an axially movable linear cam and said driven members are cam followers engaged with said cam.

5. The chuck of claim 4 wherein said cam has a first position for rotating said jaws to a workpiece holding position and a second position for rotating said jaws to a workpiece rebiasing position, said cam spring biased to said first position.

* * * * *